Patented Mar. 25, 1941

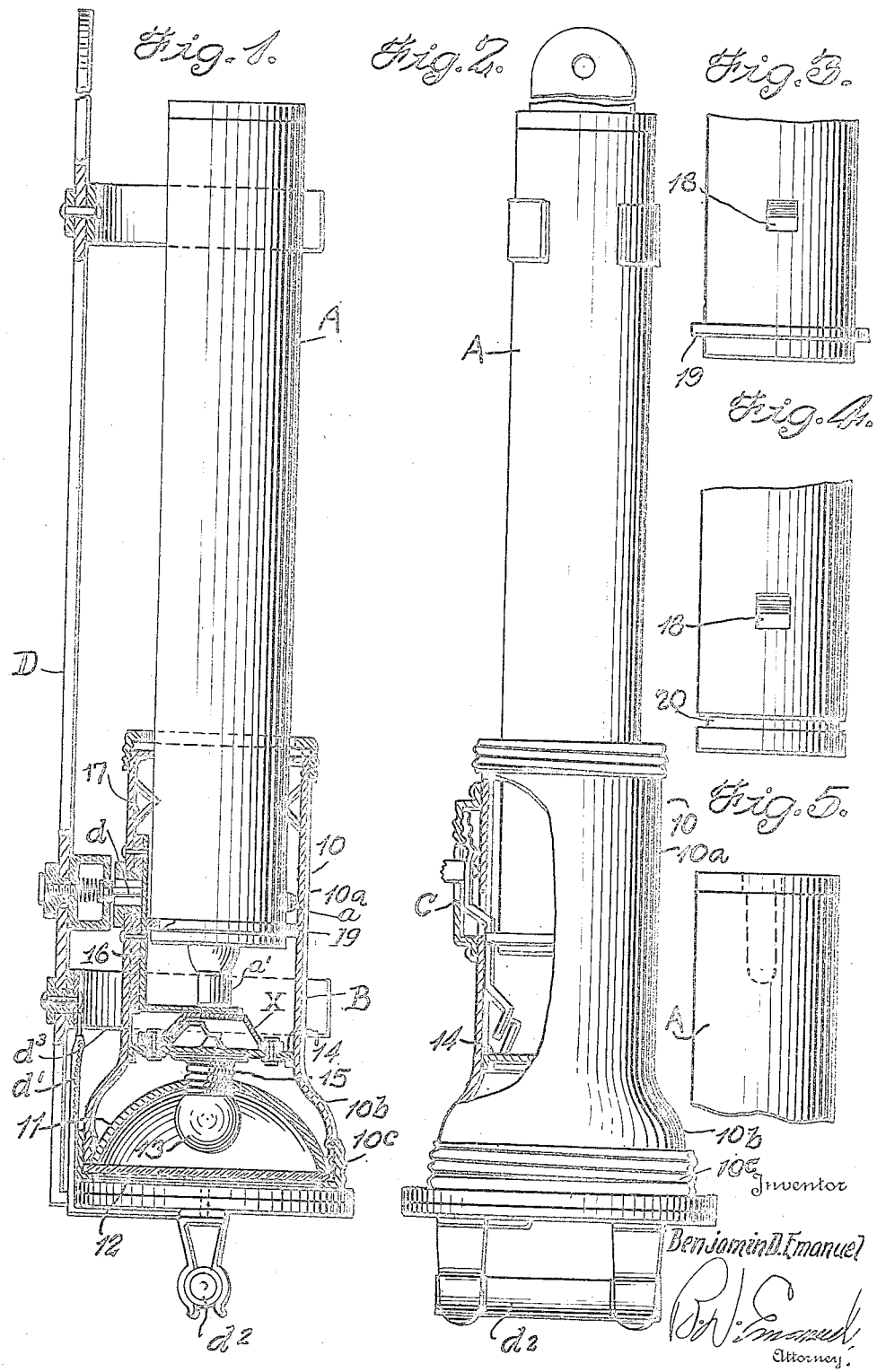

2,236,338

UNITED STATES PATENT OFFICE 2,236,338

LIGHTING ASSEMBLY

Benjamin D. Emanuel, Anderson, Ind.

Application March 31, 1939, Serial No. 265,311

6 Claims. (Cl. 240—10.6)

This invention relates to certain new and useful improvements in lighting assemblies, and pertains more particularly to flashlight unit assemblies. In certain aspects, the invention is of the type disclosed in my companion application, Serial Number 204,239, filed April 25, 1938, an assembly which will be briefly outlined.

The flashlight type referred to is designed to provide a flashlight of the general configuration found in commercial development for many years, but in which the assembly utilizes rechargeable batteries instead of the usual dry-cell battery structures. The type itself provides for recharging the battery while the latter remains in position within the flashlight casing, and the assemblies are such that the light, when not in use, is supported on a support with the latter arranged to complete a charging circuit whenever the light unit is so positioned, the details of the assembly being such that the charging operation thus requires no attention, and the light unit is kept in efficient condition by simply placing it on its support to await the next period of use.

To provide the result the light unit has a battery capable of providing efficient action for a number of hours—generally materially longer than would be found with the usual flashlight—so that the recharging action is generally required only to tend to restore a partially-depleted battery, thus permitting the use of a relatively low charging rate such as will not set up the conditions of overcharging, as a result of which the user need not give any personal attention to the charging action. The battery is equipped with the essential electrolyte and sealed, and is capable of service over extended periods—a year of more—after which it can be returned to the manufacturer and a substitute obtained at low cost, the manufacturer thus retaining somewhat of a control over the efficiency of the assembly since assurance is had that the proper equipment is being employed.

The recharging of the battery entails the use of a variable circuit condition within the lighting unit so as to permit control of the lamp in actual service, and at the same time provide for the automatic charging action when the lamp is positioned on its support, the battery automatically meeting the conditions of gassing, etc., during the charging. The charging circuit is automatically established by positioning the lighting unit on its support, the latter being arranged to permit control of the rate of charging to meet the service conditions of frequent or infrequent usage.

The disclosure of the companion application referred to presents the details of preferred forms of assemblies, each of which is capable of producing the above results, the assemblies, however, each having the battery enclosed within the light unit casing as with the commercial form. The present invention, while providing the same general results of the type, presents a variation in this latter respect in that the light casing presents but a portion of the overall length of the light unit, a portion of such overall length being provided by the battery itself, a portion only of which is mounted within the light casing. This is made possible through the fact that the length of the battery per se is such that it can serve as the gripping element of the light unit, so that the light casing is comparatively short and located at one end of the battery, the casing containing the lamp and reflecting zone and a zone of sufficient length to provide an efficient zone of connection with the battery and at the same time carry the circuit connections which permit the normal service of the flashlight unit as well as recharging of the battery.

Several advantages accrue by reason of this change from the usual commercial shape of flashlight units, and as simulated by the shape of the units of the companion application referred to. All flashlight units of this general type, are adapted to be grasped by the hand of the user, so that each carries a zone designed to serve as such gripping zone; in the commercial type, and in the forms of the companion application, this zone is provided by the casing of the light unit. As a result, the diameter of the battery must be retained within small limits, since the diameter of a gripping zone of the light unit must be sufficiently small as to permit the hand and fingers of the average user to efficiently grasp the unit within the zone; since the battery necessarily does not tightly fit the casing, the diameter of the exterior of the battery casing is necessarily still smaller, with the internal diameter of the battery casing reduced by the thickness of the walls of the battery casing. As a result, the space within the battery is itself reduced, tending to reduce the capacity of the battery.

On the contrary, the lamp and reflecting zone of the unit are generally enlarged, there being no limit in this respect for service conditions—in fact, the unit can be made more effective by increasing the dimensions of the bulb used as well as the reflecting surface; hence, the dimensions of the lamp and reflecting zone may be increased as desired, to provide a beneficial result, a condition which would affect the appearance of the casing of the commercial type of dry-cell battery type, due to the restrictions which are set up by the need of the gripping zone.

Under the conditions provided by the present invention, the battery casing can itself provide the gripping zone of the light unit, so that it is possible to increase the diameter of the battery casing to a corresponding extent, and thus increase the internal dimensions of the battery to provide for greater capacity and therefore more efficient service characteristics. This can be done, since the dimensions of the lamp and reflector zone casing can be readily increased, with the increase also tending to increase efficiency. By the arrangement the overall appearance of the light unit is changed to some extent from that portrayed by the battery-encased type, but any loss in dimensional symmetry in this respect would be off-set by the fact that there would be set up a somewhat contrasting appearance through the presence of the battery casing—generally of hard rubber or a phenolic composition within the gripping zone, while the lamp and reflector zone would present the usual metallic appearance. By certain changes in structure as compared with the assemblies of the companion application, the assembly thus produced can be made of greater capacity—due to the increase in battery dimensions made possible—and can be made more efficient, while, at the same time, the general operation of the type itself—as exemplified by the assemblies of the companion application—are maintained.

Other advantages are to be found in the fact that the length of the casing is greatly reduced, thus decreasing the cost of production in this respect. Certain changes are required over the assembly of the companion application, due to the shortening of the length of the casing, these changes pertaining, for instance, to the location of the charging circuit terminals on the support and casing; also the need for shifting the location of the positive terminal of the battery, thus changing slightly the internal construction of the battery. However, these changes, due to the shortening of the casing, do not affect the general similarity in action of the assemblage as compared with that provided by the companion application disclosure, the underlying characteristics of the type being presented in such companion application.

While it has heretofore been contemplated to fashion flash-light assemblies of the type in which a portion of the battery is exposed to be used as a gripping element, such structures have presented certain conditions which have prevented their wide-spread adoption. A few of these will be referred to:

For instance, several of the proposed structures utilize batteries of the dry-cell type. One of the forms practically secures the casing and battery together against removal; such structures are designed to be discarded as an entirety when the battery is spent, so that the assembly itself is more in the nature of a toy, with the bulb zone of cheap structure, since the assembly must be produced at very low cost to warrant expenditure of the cost warranted by the short life of the battery. A more expensive form permits replacement of the battery, but because of this condition, it becomes necessary to have the batteries and bulb zone equipped with special forms of terminals to permit the user to substitute one battery for another and assure proper operation; the structure therefore requires the use of a special form of dry-cell battery structure, at a materially increased cost of production, although the life of the battery is not increased.

It has also been proposed—mainly in the miner's lamp art—to provide the bulb zone with an attachable rechargeable battery, the two being generally assembled by a screw-threaded connection. These lamps differ from the usual miner's lamp structures designed to be carried on the cap of the workman, and are designed more as stationary illuminating structures, in that they can be carried about and seated at different points for illumination. In such structures, the battery is removed from the bulb or casing zone for re-charging. As a result, the structures are expensive, require special charging stations, and require especial care in assemblage after re-charging—due to the need for preventing any possibility of any escape of spark or flame in order to prevent mine explosions; special expert attendants are therefore required at the charging station, under whose care the assemblies are made.

The present invention, while utilizing the rechargeable battery feature of the miner's lamp assembly structure referred to, differs vitally therefrom through the fact that the battery is re-chargeable in situ, being similar to that of the companion application above identified. As a result, there is no requirement for separation of bulb zone and battery, thus eliminating the need for attendance of a special workman, and, like the companion form, the battery is automatically charged when placed on its support and retained thereon. Certain changes in battery arrangement of terminals is required to permit this, together with changes in the bulb zone and in the support, but the assembly is itself capable of similar service conditions to those of the companion application structures, and therefore capable of use as a substitute for the usual dry-cell flash-light structures, with the cost conditions comparable to those of the companion application structures.

To these and other ends, therefore, the nature of which will be made apparent as the invention is hereinafter disclosed in detail, the invention consists in the improved construction and combination of parts hereinafter more fully described, illustrated in the accompanying drawing, and more particularly pointed out in the appended claims.

In the accompanying drawing, in which similar reference characters indicate similar parts in the several views—

Figure 1 is a view, partly in elevation and partly in section of a lighting assembly of the present invention, the same being in the form of the lighting unit and its support, the lighting unit being in its battery charging position on the support;

Figure 2 is a somewhat similar view with the assembly viewed at right angles to the position of Figure 1;

Figures 3 and 4 are fragmentary views of an end zone of the battery; and

Figure 5 is a fragmentary view of the opposite end of the battery.

The lighting unit comprises the battery A and the lamp and controlling unit B, the latter including the casing 10 in the form of a tubular portion 10a and a flared end zone 10b, the latter being designed to receive the reflector 11, the bezel 12, and the lamp bulb 13, a cap 10c of annular form serving to retain the reflector and bezel in position. The casing carries a diaphragm 14 to which the lamp socket 15 is secured, together with an assemblage which, in effect, serves to complete the operating connections with the battery, a terminal 16, carried by the casing and insulated therefrom extending between the negative terminal of the battery and such assemblage. Since terminal 16 forms a terminal of the charging circuit, such terminal 16 becomes active as a part of the circuit connections both in charging and in lighting service. The casing also carries a circuit make and break device C adapted to make and break the circuit to the other side of the lamp bulb, as is usual in flash light service.

The above are generally similar to the arrangement of the lamp structure of the companion application referred to, and in which the terminal 16 projects between and lies in contact with the terminal $a'$ of the battery and the assembly carried by the diaphragm and which includes a contact $x$ operatively connected with the end contact of the bulb 15, thus placing terminal 16 in contact relation both with the battery and the bulb. The make and break device C for the bulb is located in the opposite or casing side of the bulb circuit, as indicated in Fig. 2, so that it will be apparent that with the charging circuit inactive and the switch C closed, current flows from the battery through terminal $a'$, terminal 16 to the bulb through the assembly connections, during which time switch C provides the control. When the charging circuit is active, switch C is open, so that the current flow is then through terminal 16 from support terminal $d$ to the battery through terminal $a'$, the bulb circuit being broken. The terminal 16 is thus active both in lamp service conditions and during charging of the battery. Hence, a breakable circuit may be established between the two terminals of the battery and the lamp bulb, with the circuit controlled by device C, with the circuit from the negative terminal of the battery reaching the lamp through terminal 16 and the assemblage carried by the diaphragm and which reaches to the centre terminal of the lamp bulb, while the circuit connection with the positive terminal of the battery is provided through the casing, diaphragm 14 and the peripheral contact of the lamp bulb, the diaphragm being insulated from the assemblage carried thereby, by suitable insulating means, such, for instance, as indicated in Fig. 1, thus conforming to the arrangement presented in the companion application.

However, the length of the casing is short as compared with that of the casing of the companion application, with the result that the battery is but partially enclosed by the casing. Hence, provision must be made to provide a stable connection between the battery and casing. This can be provided in various ways, a simple arrangement being disclosed in the drawing and shown as in the form of a pair of spring arms 17 carried internally of the casing, and preferably on a diameter of the casing, although it is obvious that a greater number of such arms may be provided, if desired; at least two should be provided in order to maintain stability of the assemblage. The arms may be of suitable configuration, those shown presenting a V-shape configuration adapted to co-operate with a depression 18 of generally complementary configuration formed in the battery casing at the proper locations. These arms 17 are designed to retain the battery and casing 10 together, the arms being yieldable to permit the battery to be inserted into the casing, and then, by being "snapped" into position, to retain the two elements together. The V-shaped showing is presented as more or less illustrative of a structure which will retain the structures assembled but capable of being separated by heavy pulling action, to thereby permit ready substitution of battery if found essential. Obviously, the arm 17 may have various configurations, and may, if desired, present characteristics of a hook, a well-known construction suitable for the purpose and which would require a special form of mechanism to permit the release of the hook or catch.

To provide for stability when assembled, the periphery of the battery casing may be provided with a rubber gasket 19 mounted in an annular groove 20 positioned adjacent the end of the battery casing, the gasket contacting the inner face of the casing 10 and thus tending to retain the two elements against "wobbling." Other well-known ways of securing a similar result may be employed, the gasket being illustrative in this respect, the arrangement being designed to produce a connection or contact condition at spaced points longitudinally of the battery casing.

The battery construction differs internally slightly from that disclosed in the companion application above identified, in that the exposed position terminal of the battery is shifted from a position at the end of the battery casing opposite the negative terminal—the arrangement of the companion structure—to a point on the periphery of the battery casing which underlies the casing 10, illustrated for instance at $a'$ in Fig. 1. Such shifting is readily accomplished when constructing the battery. The shift is necessitated by the fact that the flashlight casing forms a part of the circuit connections, and since casing 10 does not extend to both ends of the battery casing in the present embodiment, it becomes necessary to shift the position of the terminal. In other respects, the battery structure is generally similar to that disclosed in the companion application, or to that disclosed in my companion application filed March 20, 1939, Serial No. 263,004.

As shown, the flashlight is adapted to be recharged under conditions similar to those of the companion applications, through the use of a charging support D which is adapted to receive and support the flashlight when the latter is not in service. The support carries connections from the opposite sides of a charging source, and carries a terminal $d$ adapted to co-operate with terminal 16 when the flashlight is in position, and a second terminal $d'$, shown in the form of a clamping structure $d^3$ adapted to contact casing 10, the charging circuit thus reaching both terminals of the battery. A resistance element $d^2$ carried by the support is located within this charging circuit. When the flashlight is removed from its support for service, the charging circuit is automatically broken, and is automatically restored by returning the flashlight to its position on the support. The support is generally similar to that employed in connection with the companion applications and is therefore not specifically claimed herein; it is disclosed herein to indicate the simplicity of charging activities found in common with the forms of flashlights disclosed in the companion applications.

As indicated above one of the advantages of the present structure is the fact that the dimensions of the battery casing can be increased without increasing the gripping zone dimensions of the battery, since the usual casing characteristic of this zone of the usual flashlight is omitted, thus enabling the diameter of the battery to be increased to the dimensions previously present in the casing. This permits an increase of the inner diameter of the battery casing with a consequent increase in the volume of electrolyte which can be employed without disturbing the gripping dimensions of the flashlight. In addition, the aesthetic appearance of the flashlight is changed by the assembly, since it permits of a desirable contrast in color, etc., between the gripping zone and the lamp end of the flashlight.

These conditions may tend to increase the dimensions of the lamp casing diametrically, but this presents no disadvantage since this casing is beyond the gripping zone; it becomes advantageous in permitting larger dimensions of the lamp and its reflector, if desired, a result which can be secured without increasing the diametrical dimensions of the gripping zone.

While I have herein shown and described one or more ways in which the present invention may be provided, it will be readily understood that changes and modifications therein may be found desirable or essential in meeting the various exigencies of service or particular wishes of users, and I therefore desire to be understood as reserving the right to make any and all such changes or modifications therein as may be found desirable or essential, insofar as the same may fall within the spirit and scope of the invention as expressed in the accompanying claims when broadly construed.

What is claimed as new is:

1. In lighting assemblies, and in combination, a portable unit of the flashlight type and wherein the axes of bulb and battery are in substantial alinement, said unit comprising a casing carrying a bulb zone, a rechargeable battery receivable within the casing, and manually-controllable circuit connections between the battery and bulb with the connections including the casing, said casing having a length sufficiently greater than the length of the bulb zone as to receive and house an end zone of the battery and retain the remainder of the battery length exposed to thereby constitute the battery as the hand-grip of the unit, said battery having one of its terminals exposed at the housed battery and with the second terminal exposed at the side of the battery within the housed end zone of and in contact with the casing, said casing and battery having complemental co-operative means for retaining them in such assembled relation, said casing additionally carrying an internal terminal accessible through an opening of the casing within such housed end zone, said internal terminal being insulated from the casing and having a portion extending into contact relation with the end terminal of the battery and with a complemental contact of the bulb circuit connections; and a support for the unit, said support having means to establish operative connections with a charging circuit and having additional means to operatively connect one side of the charging circuit to the unit casing and the other side of the charging circuit to said internal terminal through said casing opening when the unit is positioned with the bulb zone in contact with the supporting face of the support, whereby the charging circuit will be automatically completed by the positioning of the unit and be broken by the removal of the unit from such position on the support for use and to thereby permit unit battery charging with the battery unit-position maintained.

2. An assembly as in claim 1 characterized in that the support additionally carries clips for receiving and holding the unit in position, with one of said clips engaging the casing and being operatively connected to one side of the charging circuit, and also carrying clips to receive a resistance unit adapted to form a part of such side of the charging circuit, whereby the charging rate of the battery may be controlled.

3. An assembly as in claim 1 characterized in that the housed end of the battery is telescoped within the casing end, and that the battery and casing carry said complemental co-operative means within such telescoped zone to preserve and maintain the telescoped relationship.

4. An assembly as in claim 1 characterized in that the housed end of the battery is telescoped within the casing, and that the battery and casing carry said complemental co-operative means within such telescoped zone to preserve and maintain the telescoped relationship, said means including yieldable gripping elements carried internally of the casing, with the periphery of the battery having means complemental thereto and co-operative therewith to maintain the telescoped condition.

5. An assembly as in claim 1 characterized in that the housed end of the battery is telescoped within the casing, and that the battery and casing carry said complemental co-operative means within such telescoped zone to preserve and maintain the telescoped relationship, said battery additionally carrying means adapted to co-operate with the casing to provide stability of the telescope against "wobbling."

6. An assembly as in claim 1 characterized in that the housed end of the battery is telescoped within the casing, and that the battery and casing carry said complemental co-operative means within such telescoped zone to preserve and maintain the telescoped relationship, said battery additionally carrying means adapted to co-operate with the casing to provide stability of the telescope against "wobbling," said latter means being in the form of an elastic gasket carried by the battery in spaced relationship to the telescope-retaining means.

BENJAMIN D. EMANUEL.